(12) United States Patent
Zhou et al.

(10) Patent No.: US 12,181,942 B2
(45) Date of Patent: Dec. 31, 2024

(54) APPARATUS AND METHOD FOR REAL-TIME CLOCK MODULE OF SYSTEM-ON-CHIP

(71) Applicant: SHENZHEN MICROBT ELECTRONICS TECHNOLOGY CO., LTD., Shenzhen (CN)

(72) Inventors: Chaoxian Zhou, Shenzhen (CN); Lin Song, Shenzhen (CN); Yongzhi Lyu, Shenzhen (CN); Jianbo Liu, Shenzhen (CN); Heping Wang, Shenzhen (CN)

(73) Assignee: SHENZHEN MICROBT ELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/709,225

(22) PCT Filed: Dec. 15, 2022

(86) PCT No.: PCT/CN2022/139413
§ 371 (c)(1),
(2) Date: May 10, 2024

(87) PCT Pub. No.: WO2023/130936
PCT Pub. Date: Jul. 13, 2023

(65) Prior Publication Data
US 2024/0329710 A1    Oct. 3, 2024

(30) Foreign Application Priority Data
Jan. 10, 2022   (CN) .................. 202210020171.5

(51) Int. Cl.
*G06F 1/28*  (2006.01)
*G06F 1/08*  (2006.01)
*G06F 1/30*  (2006.01)

(52) U.S. Cl.
CPC ................ *G06F 1/305* (2013.01); *G06F 1/08* (2013.01); *G06F 1/28* (2013.01)

(58) Field of Classification Search
CPC ................ G06F 1/305; G06F 1/08; G06F 1/28
See application file for complete search history.

(56) References Cited

U.S. PATENT DOCUMENTS

| 2006/0284324 A1 | 12/2006 | Bakker |
| 2008/0104433 A1 | 5/2008 | May et al. |
| 2019/0199105 A1 | 6/2019 | Hofer et al. |

FOREIGN PATENT DOCUMENTS

| CN | 101023403 A | 8/2007 |
| CN | 201298888 Y | 8/2009 |

(Continued)

OTHER PUBLICATIONS

Notification to Grant Patent Right for Invention issued Mar. 18, 2022 in Chinese Patent Application No. 202210020171.5.

(Continued)

*Primary Examiner* — Zahid Choudhury
(74) *Attorney, Agent, or Firm* — Venable LLP (57) ABSTRACT

The present disclosure relates to an apparatus and a method for a real-time clock (RTC) module of a system-on-chip (SoC), and provides an apparatus for powering battery-powered RTC module of an SoC. The apparatus is integrated in the RTC module and comprises: a first regulator stage comprising one or more regulators, wherein the first regulator stage is configured to provide a core power supply voltage (VDD_CORE) on the basis of battery output voltage (VDD_BAT); and a crystal oscillator I/O unit, the crystal oscillator I/O unit being powered by the core power supply voltage (VDD_CORE) and an I/O power supply voltage (Continued)

(VDD_IO), wherein the apparatus directly provides the battery output voltage (VDD_BAT) as the I/O power supply voltage (VDD_IO).

20 Claims, 5 Drawing Sheets

(56) References Cited

FOREIGN PATENT DOCUMENTS

| | | |
|---|---|---|
| CN | 102692948 A | 9/2012 |
| CN | 206021129 U | 3/2017 |
| CN | 108628384 A | 10/2018 |
| CN | 109656292 A | 4/2019 |
| CN | 114035649 A | 2/2022 |
| CN | 114035649 B | 4/2022 |
| EP | 3316385 A1 | 5/2018 |

OTHER PUBLICATIONS

First Office Action issued Feb. 23, 2022 in Chinese Patent Application No. 202210020171.5.
International Search Report mailed Mar. 1, 2023 in International Patent Application No. PCT/CN2022/139413.

APPARATUS AND METHOD FOR REAL-TIME CLOCK MODULE OF SYSTEM-ON-CHIP

CROSS-REFERENCE TO RELATED APPLICATIONS

This application is a national stage of International Application No. PCT/CN2022/139413, filed on Dec. 15, 2022, which is based on and claims the priority of Chinese Patent Application No. 202210020171.5 filed on Jan. 10, 2022, the contents of which are hereby incorporated by reference in their entirety.

TECHNICAL FIELD

The present disclosure generally relates to the field of integrated circuits, and specifically, to an apparatus and method for a real time clock module of a system on chip.

BACKGROUND

A system on chip (SoC) may include a real time clock (RTC) module, to provide an accurate clock reference for the SoC. A battery independent of a power supply of the SoC may be used to supply power to the RTC module, so that the RTC module can be kept running even if the entire SoC is powered down, thereby providing real time and accurate clock signals and time information to the SoC.

In particular, a button battery may be configured to supply power to an RTC module. The capacity of a button battery is relatively small and the nominal capacity of a button battery commonly used in an RTC module is generally about 200 mAh; moreover, to keep the RTC module to run more than one year, the power consumption current of the RTC module generally needs to be at a microampere (µA) level. A nominal output voltage of a button battery is mostly 3 V or 1.5 V, but as the battery level decreases, an actual output voltage of the button battery may slowly drop. Especially at a low temperature, a steady-state output voltage of the button battery may be much lower than an output voltage at a room temperature.

A crystal oscillator (Crystal Oscillator) unit integrated onto an outer part of the RTC module is often used as a clock source for providing a clock of a basic frequency for the RTC module, and the crystal oscillator unit usually includes a 32768 Hz passive crystal or active crystal, and an oscillation circuit is formed by a crystal oscillator I/O unit and a crystal oscillator unit, so as to generate a 32768 Hz crystal oscillator clock. The crystal oscillator I/O unit coupled to the crystal oscillator unit needs to be provided with two power supply voltages, i.e., an I/O power supply voltage (VDD_IO) and a core power supply voltage (VDD_CORE); usually, VDD_IO is higher than VDD_CORE. In addition, an internal logic of the RTC module may be powered by using the core power supply voltage (VDD_CORE). The use of an additional external power supply module to provide the power supply voltages, i.e., VDD_IO and VDD_CORE, for the RTC module may result in an increased cost. Therefore, it may be considered to generate VDD_IO and VDD_CORE based on the voltage (VDD_BAT) outputted by the button battery.

SUMMARY

To solve the foregoing problem, the present disclosure provides an apparatus and method for an RTC module of an SoC, and the apparatus may include a regulator and be configured to provide an I/O power supply voltage (VDD_IO) and a core power supply voltage (VDD_CORE) based on a battery output voltage (VDD_BAT).

A first aspect of the present disclosure provides an apparatus for supplying power to a real time clock RTC module of a system on chip SoC, where the RTC module is powered by a battery, and the apparatus is integrated into the RTC module and includes: a first regulator stage, including one or more regulators, where the first regulator stage is configured to provide a core power supply voltage VDD_CORE based on a battery output voltage VDD_BAT; and a crystal oscillator I/O unit, the crystal oscillator I/O unit being powered by the core power supply voltage VDD_CORE and an I/O power supply voltage VDD_IO, where the apparatus directly provides the battery output voltage VDD_BAT as the I/O power supply voltage VDD_IO.

A second aspect of the present disclosure provides a real time clock RTC module for implementing a system on chip SoC, where the RTC module includes: the apparatus according to the first aspect of the present disclosure; and a voltage detection module, configured to detect a power supply voltage of a main control module of the SoC and in a case that a power supply voltage of the main control module is lower than a main control power supply voltage threshold, output an isolation enable signal to isolate, from the RTC module, a signal from the main control module.

A third aspect of the present disclosure provides a method for supplying power to a real time clock RTC module of a system on chip SoC, where the RTC module is powered by a battery, and the method includes: in a case that a range of a battery output voltage VDD_BAT is within a range of an I/O power supply voltage VDD_IO, directly providing the battery output voltage VDD_BAT as the I/O power supply voltage VDD_IO, and converting the battery output voltage VDD_BAT into a core power supply voltage VDD_CORE by using a first regulator stage that is in the RTC module and includes one or more regulators; and in a case that the range of the battery output voltage VDD_BAT goes beyond the range of the I/O power supply voltage VDD_IO: converting the battery output voltage VDD_BAT into the I/O power supply voltage VDD_IO by using a second regulator stage that is in the RTC module and coupled in series to the first regulator stage and includes one or more regulators, and converting the I/O power supply voltage VDD_IO provided by the second regulator stage into the core power supply voltage VDD_CORE by using the first regulator stage; or converting the battery output voltage VDD_BAT into the I/O power supply voltage VDD_IO by using a second regulator stage that is in the RTC module and coupled in parallel to the first regulator stage and includes one or more regulators, and converting the battery output voltage VDD_BAT into the core power supply voltage VDD_CORE by using the first regulator stage, where the core power supply voltage VDD_CORE and the I/O power supply voltage VDD_IO are used for supplying power to the crystal oscillator I/O unit.

A fourth aspect of the present disclosure provides a method for a real time clock RTC module of a system on chip SoC, where the method includes: the method according to the third aspect of the present disclosure; and detecting a power supply voltage of a main control module of the SoC by using a voltage detection module in the RTC module and in a case that a power supply voltage of the main control module is lower than a main control power supply voltage threshold, outputting an isolation enable signal to isolate, from the RTC module, a signal from the main control module.

Through detailed descriptions of exemplary embodiments of the present disclosure with reference to the following accompanying drawings, other features and advantages of the present disclosure will become clear.

BRIEF DESCRIPTION OF THE DRAWINGS

The accompanying drawings that constitute a part of the specification illustrate embodiments of the present disclosure, and are used to explain the principle of the present disclosure together with the specification.

With reference to the accompanying drawings, the present disclosure can be understood clearer according to the following detailed descriptions, where.

For ease of understanding, locations, sizes, scopes, and the like of structures shown in the accompanying drawings sometimes do not represent practical locations, sizes, scopes, and the like. Therefore, the disclosure is not limited to the locations, dimensions, the scopes, and the like disclosed in the accompanying drawings, or the like. Moreover, the accompanying drawings are not necessarily drawn to scale, and some features may be exaggerated to show the details of specific components.

DETAILED DESCRIPTION

The following describes in detail exemplary embodiments of the present disclosure with reference to the accompanying drawings. It is to be noted that unless otherwise specified, the relative deployment, the numerical expression, and values of the components and steps stated in the embodiments do not limit the scope of the present disclosure.

The following descriptions of at least one exemplary embodiment are merely illustrative, and in no way put any limitation on the present disclosure and the application or use thereof. In other words, the circuits and the methods are shown in an exemplary manner herein to describe different embodiments of the circuits or the methods in the present disclosure, and are not intended to be limiting. A person skilled in the art may understand that the circuits and the methods only illustrate the exemplary manner for implementing the present disclosure, rather than exhaustive manners.

Technologies, methods, and devices known to a person of ordinary skill in the art may not be discussed in detail, but in proper circumstances, the technologies, methods, and devices shall be regarded as a part of the granted specification.

Figure 1:
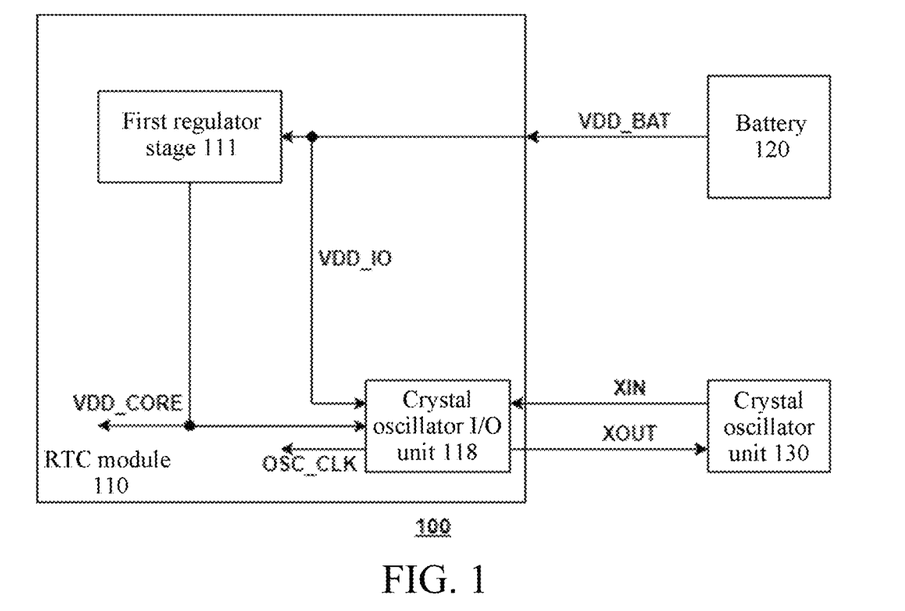
FIG. 1 is a schematic diagram of at least a part of a system according to an embodiment of the present disclosure.

FIG. 1 is a schematic diagram of at least a part of a system according to an embodiment of the present disclosure. As shown in FIG. 1, an apparatus 100 may be a part of the system, and includes an RTC module 110 of an SoC, a battery 120, and a crystal oscillator unit 130.

The battery 120 may be configured to provide a battery output voltage VDD_BAT to the RTC module 110 in a case that the SoC is powered down. In an embodiment of the present disclosure, the battery 120 may be a button battery. However, it should be noted that the power supply that can be used for supplying power to the RTC module in the present disclosure is not limited thereto, and other types of batteries or super capacitors or the like can also be used. In the present disclosure, VDD_BAT may vary relative to a nominal output voltage. For example, VDD_BAT may decrease due to a low temperature or due to a decrease in the battery level of the battery.

In an embodiment of the present disclosure, in a case that the SoC is not powered down, the RTC module 110 may be powered by the main power supply of the SoC instead of the battery 120. In the embodiment of the present disclosure, in a case that the SoC is not powered down, the RTC module 110 may still be powered only by the battery 120.

The crystal oscillator unit 130 may include a 32768 Hz passive crystal, configured to be coupled, through XIN and XOUT ports, to a crystal oscillator I/O unit 118 in the RTC module 110 to form an oscillation circuit, so as to generate a 32768 Hz crystal oscillator clock OSC_CLK, and the crystal oscillator I/O unit 118 may provide the generated OSC_CLK to the RTC module 110. It should be noted that the crystal that can be used to generate the crystal oscillator clock OSC_CLK in the present disclosure is not limited to a passive crystal, and the frequency of the generated crystal oscillator clock OSC_CLK is not limited to 32768 Hz.

In an embodiment according to the present disclosure, the crystal oscillator unit 130 may also be an active crystal oscillator, and the I/O power supply voltage VDD_IO may be outputted to the crystal oscillator unit 130 to supply power to the active crystal oscillator.

In the present disclosure, batteries 220, 320, 420, 520, 620, 720, and the like to be mentioned below may be similar to the battery 120, and crystal oscillator units 230, 330, 430, 530, 630, 730, and the like to be mentioned below may be similar to the crystal oscillator unit 130, which are therefore not to be detailed below.

The RTC module 110 shown in FIG. 1 may be adapted to a case in which a range of the I/O power supply voltage VDD_IO can cover a variation range of the output voltage VDD_BAT of the battery 120, i.e., the VDD_BAT is maintained within the range of VDD_IO. In a non-limiting example, VDD_IO shown in FIG. 1 may be in a range from 1.8 V to 3.3 V, and a nominal value of VDD_BAT may be 3.0 V; the undervoltage threshold may be set to VDD_BAT_TH=2.2 V, i.e., a normal operating range of VDD_BAT may be considered to be from 2.2 V to 3.0 V. Due to the fact that the range of the I/O power supply voltage 1.8 V≤VDD_IO≤3.3 V can cover the range of the battery output voltage 2.2 V≤ VDD_BAT≤3.0 V, the RTC module can be powered by directly providing VDD_BAT as VDD_IO. However, the core power supply voltage VDD_CORE for supplying power to the RTC module cannot be directly provided by VDD_BAT.

As shown in FIG. 1, the RTC module 110 may include a first regulator stage 111, and the first regulator stage 111 may include one or more regulators and be configured to generate VDD_CORE directly based on VDD_BAT. For example, the first regulator stage 111 may include any regulator capable of converting VDD_BAT into VDD_CORE, such as a low dropout linear regulator and a switch regulator. Specifically, VDD_BAT may be provided, via an analog port AVDD of the RTC module 110, to the first regulator stage 111 integrated into the RTC module 110, and the VDD_CORE obtained through conversion by the first regulator stage 111 may be provided to the crystal oscillator I/O unit 118; and VDD_BAT may alternatively be directly wired to the crystal oscillator I/O unit 118 or directly provided to the crystal oscillator I/O unit 118 in the RTC module 110. In addition, the crystal oscillator clock OSC_CLK may be provided by the crystal oscillator I/O unit 118 to the RTC module 110. Here, the I/O power supply voltage VDD_IO may refer to a power supply voltage for an input/output port of the RTC module, and the voltage VDD_IO may be provided to peripherals of the RTC module 110; the core power supply voltage VDD_CORE may refer to a power supply voltage for an internal logic of the RTC module, and the voltage may be provided to the internal logic of the RTC module 110, or may be provided to peripherals of the RTC module 110.

The RTC module 110 may further include a crystal oscillator I/O unit 118, and the crystal oscillator I/O unit 118 may be configured to be powered by a power supply voltage (such as an I/O power supply voltage VDD_IO and a core power supply voltage VDD_CORE).

Although not shown in FIG. 1, the RTC module 110 may further include a frequency divider, a counter, a register, a control logic, and other modules, which are well known in the art and therefore are not described in detail herein.

The circuit shown in FIG. 1 may advantageously maintain stable power supplying to the RTC module 110 by using the battery 120 in a case that the SoC is powered down.

It should be understood that the first regulator stage 111 in FIG. 1 is shown as being integrated into the RTC module 110, but the first regulator stage 111 may alternatively be located outside of the RTC module 110 and coupled to the RTC module 110 and the battery 120, to supply power to the RTC module based on VDD_BAT.

Figure 2:
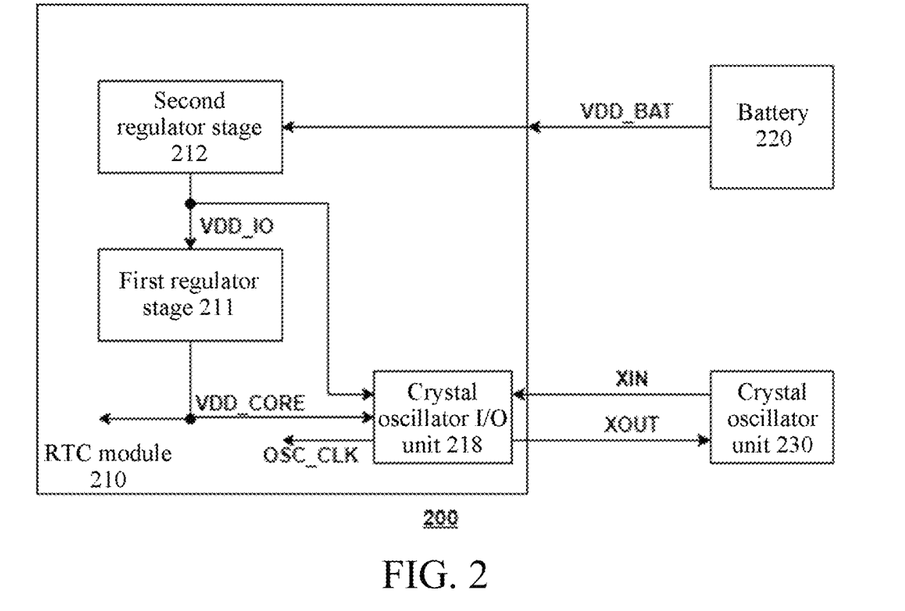
FIG. 2 is a schematic diagram of at least a part of a system according to an embodiment of the present disclosure.

FIG. 2 is a schematic diagram of at least a part of a system according to an embodiment of the present disclosure. As shown in FIG. 2, an apparatus 200 may be a part of the system, and includes an RTC module 210 of an SoC, a battery 220, and a crystal oscillator unit 230.

The RTC module 210 is different from the RTC module 110 shown in FIG. 1, and the RTC module 210 may be adapted to a case in which the range of the I/O power supply voltage VDD_IO cannot cover the variation range of the battery output voltage VDD_BAT, that is, a case in which VDD_BAT goes beyond the range of VDD_IO. In a non-limiting example, the case in which the range of VDD_IO cannot cover the variation range of VDD_BAT includes: the range of VDD_IO is excessively narrow compared to the range of VDD_BAT, or even is covered by the range of VDD_BAT, and for example, the range of VDD_IO is 1.8 V±10%, and the normal operating range of VDD_BAT is from 1.8 V to 3.0 V; and the range of VDD_IO is misaligned with the range of VDD_BAT, i.e., only partially coincident, or even not coincident at all, and for example, the normal operating range of VDD_BAT is from 1.8 V to 3.0 V, and the range of VDD_IO is from 1.2 V to 1.8 V. In such a case, VDD_BAT cannot be directly provided as VDD_IO like in the case for the RTC module 110 in FIG. 1, and therefore the RTC module may include two regulator stages, to provide both VDD_IO and VDD_CORE.

As shown in FIG. 2, the RTC module 210 may include a first regulator stage 211 and a second regulator stage 212 coupled in series, and the first regulator stage 211 and the second regulator stage 212 may each include one or more regulators and be configured to provide, based on the battery output voltage VDD_BAT, a core power supply voltage VDD_CORE and an I/O power supply voltage VDD_IO, respectively. The second regulator stage 212 may be configured to convert VDD_BAT into VDD_IO, and the first regulator stage 211 coupled in series to the second regulator stage 212 may be configured to convert VDD_IO obtained through conversion by the second regulator stage 212 into VDD_CORE, so as to indirectly generate VDD_CORE based on the VDD_BAT. The first regulator stage 211 and the second regulator stage 212 may include any regulator capable of performing the foregoing voltage conversion, such as a low dropout linear regulator and a switch regulator. For an RTC module that includes a step-down regulator such as a low dropout linear regulator, the configuration of FIG. 2 is suitable for a case in which VDD_IO>VDD_CORE. Specifically, VDD_BAT may be provided, via an analog port AVDD of the RTC module 210, to the second regulator stage 212 integrated into the RTC module 210, VDD_IO obtained through conversion by the second regulator stage 212 may be directly wired in the RTC module, to be provided to a crystal oscillator I/O unit 218, and VDD_CORE obtained through conversion by the first regulator stage 211 may be provided to the crystal oscillator I/O unit 218. In addition, the crystal oscillator clock OSC_CLK may be provided by the crystal oscillator I/O unit 218 to the RTC module 210.

Figure 3:
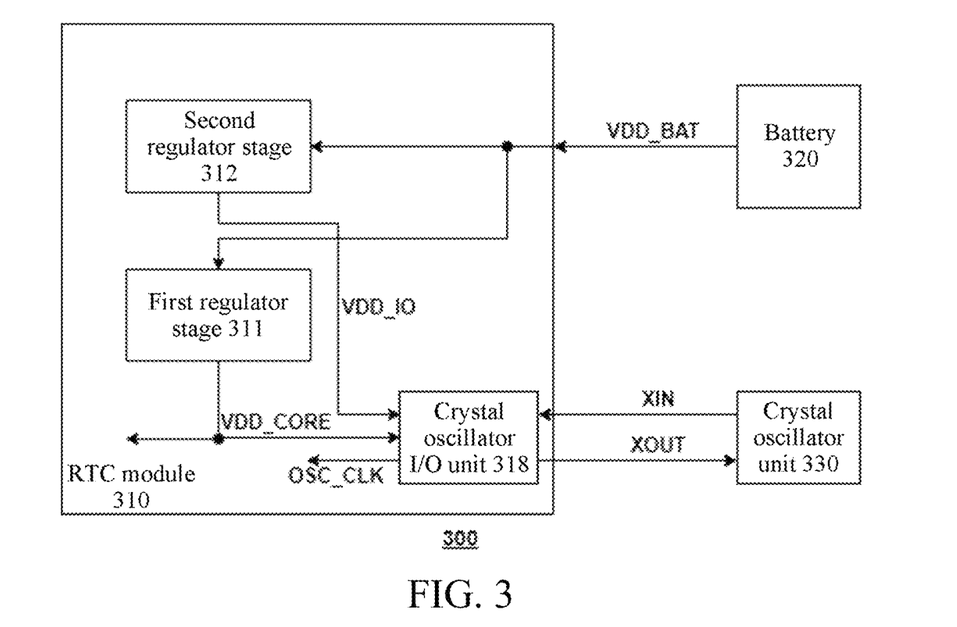
FIG. 3 is a schematic diagram of at least a part of a system according to an embodiment of the present disclosure.

FIG. 3 is a schematic diagram of at least a part of a system according to an embodiment of the present disclosure. As shown in FIG. 3, an apparatus 300 may be a part of the system, and includes an RTC module 310 of an SoC, a battery 320, and a crystal oscillator unit 330.

The RTC module 310 is similar to the RTC module 210 described above with reference to FIG. 2, except that the RTC module 310 includes a first regulator stage 311 and a second regulator stage 312 coupled in parallel and each including one or more regulators, where the first regulator stage 311 may be configured to convert VDD_BAT into VDD_CORE and the second regulator stage 312 may be configured to convert VDD_BAT into VDD_IO. The first regulator stage 311 and the second regulator stage 312 may include any regulator capable of performing the foregoing voltage conversion, such as a low dropout linear regulator and a switch regulator. Specifically, VDD_BAT may be provided, via an analog port AVDD of the RTC module 310, to the first regulator stage 311 and the second regulator stage 312 integrated into the RTC module 310, and VDD_CORE obtained through conversion by the first regulator stage 311 may be provided to the crystal oscillator I/O unit 318; and VDD_IO obtained through conversion by the second regulator stage 312 may be directly wired to the crystal oscillator I/O unit 318 in the RTC module. In addition, the crystal oscillator clock OSC_CLK may be provided by the crystal oscillator I/O unit 318 to the RTC module 310.

Figure 4:
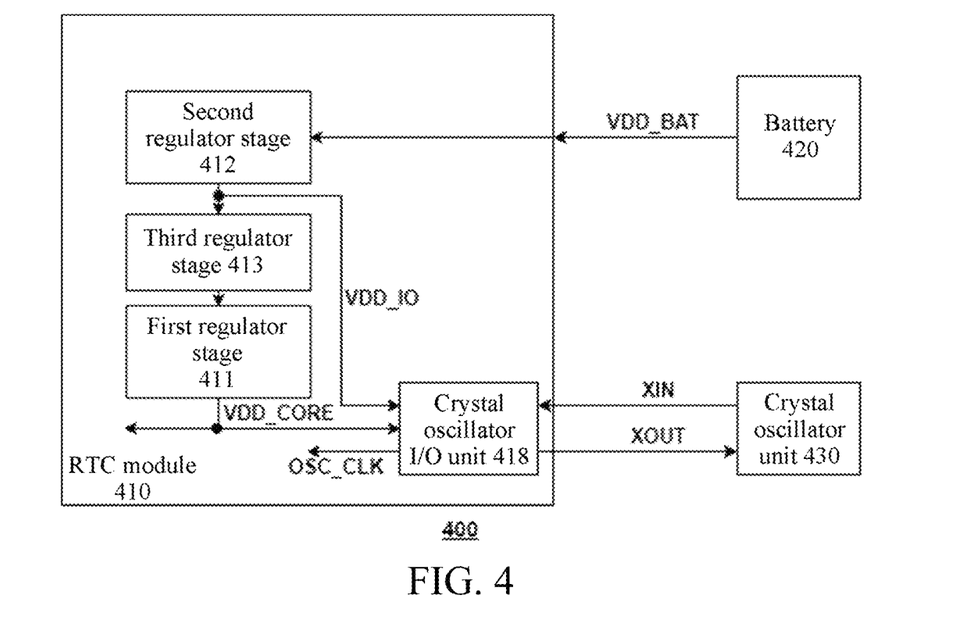
FIG. 4 is a schematic diagram of at least a part of a system according to an embodiment of the present disclosure.

FIG. 4 is a schematic diagram of at least a part of a system according to an embodiment of the present disclosure. As shown in FIG. 4, an apparatus 400 may be a part of the system, and includes an RTC module 410 of an SoC, a battery 420, and a crystal oscillator unit 430.

The RTC module 410 is similar to the RTC module 210 described above with reference to FIG. 2, except that the RTC module 410 includes a first regulator stage 411, a second regulator stage 412, and a third regulator stage 413 coupled in series and each including one or more regulators, where the second regulator stage 412 may be configured to convert VDD_BAT into VDD_IO, and the first regulator stage 411 and the third regulator stage 413 coupled in series may be configured to convert VDD_IO obtained through conversion by the second regulator stage 412 into VDD_CORE. The first regulator stage 411, the second regulator stage 412, and the third regulator stage 413 may include any regulator capable of performing the foregoing voltage conversion, such as a low dropout linear regulator and a switch regulator. Specifically, VDD_BAT may be provided, via an analog port AVDD of the RTC module 410, to the second regulator stage 412 integrated into the RTC module 410, VDD_CORE obtained through conversion by the two regulator stages 413 and 411 coupled in series may be provided to the crystal oscillator I/O unit 418, and VDD_IO obtained through conversion by the second regulator stage 412 may be directly wired in the RTC module, to be provided to the crystal oscillator I/O unit 418. In addition, the crystal oscillator clock OSC_CLK may be provided by the crystal oscillator I/O unit 318 to the RTC module 410.

Configurations of the RTC module 410 shown in FIG. 4 are similar to configurations of the RTC module 210 shown in FIG. 2, i.e., similarly, the RTC module 410 includes a plurality of regulator stages coupled in series. Compared with the configurations in FIG. 2, the configurations shown in FIG. 4 may be advantageously applied to a case in which a single first regulator stage 411 cannot provide required VDD_CORE based on VDD_IO, for example, a case in which a single first regulator stage 411 cannot provide VDD_CORE having a voltage amplitude range large enough. However, it should be understood that the plurality of regulator stages included in the RTC module may adopt other configurations as desired. For example, in a case that a digital port DVDD of the RTC module requires a greater current, the first regulator stage 411 and the third regulator stage 413 may be coupled in parallel, to provide greater current. It should be understood that the third regulator stage 413 may also be coupled in series or in parallel with the second regulator stage 412 and then coupled in series to the first regulator stage 411, to provide the required power supply. Similarly, it should be understood that a third regulator stage may also be added to the RTC module 310 shown in FIG. 3, and the third regulator stage may be coupled in series or in parallel to one of the first regulator stage and the second regulator stage and then coupled to the other one of the first regulator stage and the second regulator stage, to provide the required power supply. Further, it should be understood that the RTC module is not limited to including two or three regulator stages providing the two supply voltages, i.e., VDD_IO and VDD_CORE, but may include more regulator stages according to requirements.

Figure 5:
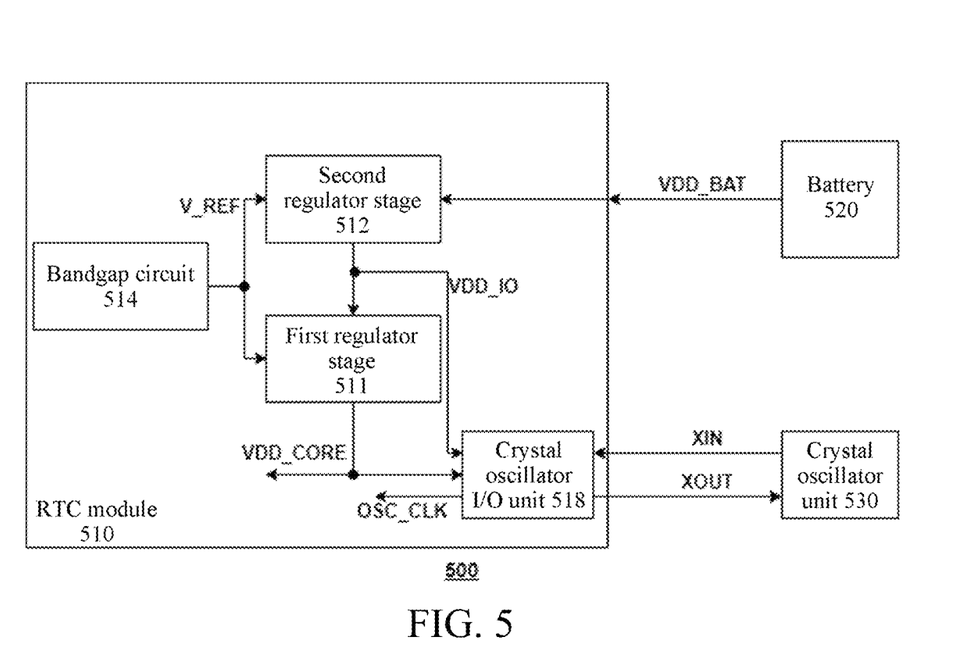
FIG. 5 is a schematic diagram of at least a part of a system according to an embodiment of the present disclosure.

FIG. 5 is a schematic diagram of at least a part of a system according to an embodiment of the present disclosure. As shown in FIG. 5, an apparatus 500 may be a part of the system, and includes an RTC module 510 of an SoC, a battery 520, and a crystal oscillator unit 530.

The RTC module 510 is similar to the RTC module 210 described above with reference to FIG. 2. Specifically, the RTC module 510 may include a first regulator stage 512, a second regulator stage 511, and a crystal oscillator I/O unit 518, which are similar to the first regulator stage 212, the second regulator stage 211, and the crystal oscillator I/O unit 218 described above, respectively. The difference is that the RTC module 510 is shown to also have a bandgap circuit 514 integrated therein, and the bandgap circuit 514 may be configured to generate a common reference voltage V_REF that is provided to the regulator stages 511 and 512 included in the RTC module 510. For the RTC modules 310 and 410 shown in FIG. 3 and FIG. 4, a bandgap circuit may also be similarly included to provide a common reference voltage V_REF for the regulator stages in the RTC module, so as to provide relative calibration between the plurality of regulator stages. It should be understood that the RTC modules in the present disclosure may each similarly include a bandgap circuit that provides a reference voltage V_REF.

Figure 6:
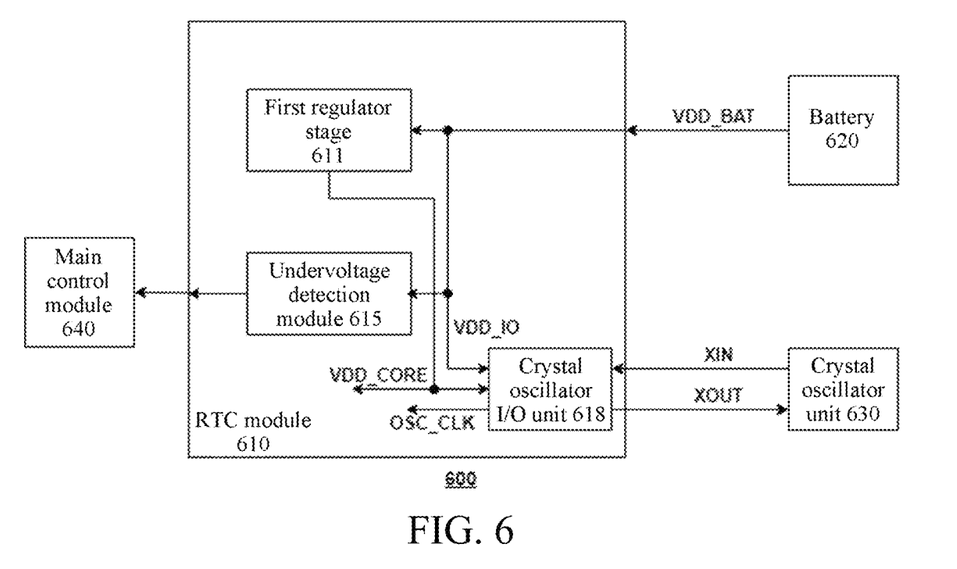
FIG. 6 is a schematic diagram of at least a part of a system according to an embodiment of the present disclosure.

FIG. 6 is a schematic diagram of at least a part of a system according to an embodiment of the present disclosure. As shown in FIG. 6, an apparatus 600 may be a part of the system, and includes an RTC module 610 of an SoC, a battery 620, a crystal oscillator unit 630, and a main control module 640 of the SoC.

The RTC module 610 shown in FIG. 6 is similar to the RTC module 110 described above with reference to FIG. 1. Specifically, the RTC module 610 may include a first regulator stage 611 and a crystal oscillator I/O unit 618, which are similar to the first regulator stage 112 and the crystal oscillator I/O unit 118 described above, respectively. The difference is that the RTC module 610 is shown to also include an undervoltage detection module 615. The undervoltage detection module 615 is configured to perform undervoltage detection on a battery output voltage VDD_BAT of the battery 620 and to generate an undervoltage indication signal upon detecting that the battery output voltage VDD_BAT is lower than a battery output voltage threshold (such as an undervoltage threshold VDD_BAT_TH). The undervoltage indication signal may be stored in the RTC module and outputted to the main control module 640 of the SoC, to trigger an undervoltage alarm about the battery in the SoC main control module 640 in an operating state.

In an embodiment according to the present disclosure, the undervoltage detection module 615 integrated into the RTC module 610 may share a reference voltage (such as the reference voltage V_REF generated by the bandgap circuit described above) with a regulator stage (such as the first regulator stage 611) in the RTC module 610. The battery output voltage threshold may be set to a multiple, such as an integer multiple, of the reference voltage V_REF generated by the bandgap circuit.

In a non-limiting example, in a case that V_REF=0.75 V and a nominal output voltage of the battery is 3 V, a battery output voltage threshold (such as an undervoltage threshold VDD_BAT_TH) may be set to 3*V_REF=2.25 V. In a case that VDD_BAT just drops to 3*V_REF, although the RTC module 610 operates in an undervoltage condition, the power supplied by the battery 620 can still support the RTC module 610 to operate normally for a period of time. In this case, the undervoltage detection module 615 may output a valid undervoltage indication, and the undervoltage indication may be latched in the RTC module 610 by a register and outputted to the main control module of the SoC. Therefore, when the main control module of the SoC is powered on to operate, the battery undervoltage alarm can be received to guide a user to replace the button battery. In a case that the button battery supply voltage drops to an extent that the RTC module cannot operate normally, timing of the RTC module may fail, but the functions of the SoC are not affected.

Figure 7:
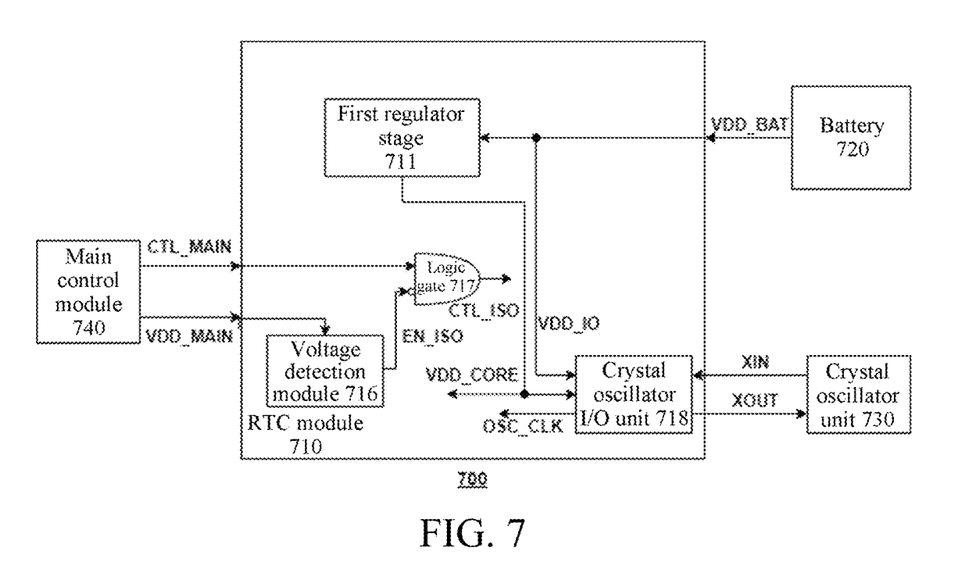
FIG. 7 is a schematic diagram of at least a part of a system according to an embodiment of the present disclosure.

FIG. 7 is a schematic diagram of at least a part of a system according to an embodiment of the present disclosure. As shown in FIG. 7, an apparatus 700 may be a part of the system, and includes an RTC module 710 of an SoC, a battery 720, a crystal oscillator unit 730, and a main control module 740 of the SoC.

Due to the fact that the RTC module is a dedicated circuit integrated on the SoC, the RTC module needs to accept control and access by the main control module on the SoC. However, the RTC module has its own independent power supply, and the RTC module still maintains operation when the other modules of the SoC are powered down. Therefore, for control and access signals from the main control module of the SoC to be transmitted to the RTC module, isolation processing needs to be performed in the RTC module, so as to prevent an unknown state from being introduced into the RTC module in a case that the main control module of the SoC is powered down.

The RTC module 710 shown in FIG. 7 is similar to the RTC module 110 described above with reference to FIG. 1. Specifically, the RTC module 710 may include a first regulator stage 711 and a crystal oscillator I/O unit 718, which are similar to the first regulator stage 112 and the crystal oscillator I/O unit 118 described above, respectively. The difference is that the RTC module 710 is shown to further include a voltage detection module 716 and a logic gate 717. The voltage detection module 716 may be configured to be coupled to a main control module 740 of the SoC, to detect a power supply voltage VDD_MAIN of the main control module 740. Upon detecting that the power supply voltage VDD_MAIN is lower than a threshold, it can be determined that the main control module 740 of the SoC is in a power-off state; in this case, the voltage detection module 716 outputs an isolation enable signal EN_ISO, and the isolation enable signal EN_ISO can be determined to be at an effective level when the main control module 740 is determined to be in the power-off state, to isolate a signal CTL_MAIN from the main control module 740, so that the signal CTL_MAIN does not pass through the logic gate 717. Upon detecting that the power supply voltage VDD_MAIN is not lower than a threshold, it can be determined that the main control module 740 of the SoC is in a normal state; in this case, the isolation enable signal EN_ISO outputted by the voltage detection module 716 is at an ineffective level, and therefore the signal CTL_MAIN from the main control module 740 is not isolated, and the signal CTL_MAIN passes through the logic gate 717 for use by the modules in the RTC module 710. In an embodiment according to the present disclosure, the isolation of the signal CTL_MAIN from the main control module 740 may be implemented by a logic gate 717 integrated into the RTC module 710. The logic gate 717 shown in FIG. 7 is merely an example, and may be changed to other logic gates according to the polarity of the effective level of the isolation enable signal EN_ISO and other requirements.

In an embodiment according to the present disclosure, the main control module 740 may share the common reference voltage V_REF generated by a same bandgap circuit with other modules (such as the first regulator stage 711 and the logic gate 717) in the RTC module 710.

In an embodiment according to the present disclosure, the RTC module 710 may receive control and access signals from a plurality of power supply domains of the SoC. In this case, the RTC module 710 may include a plurality of voltage detection modules corresponding to these power supply domains, where each voltage detection module may be configured to detect a power supply voltage of a corresponding power supply domain, and in a case that the power supply voltage of the power supply domain is lower than a threshold, output an isolation enable signal to isolate, from the RTC module, control and access signals from the powered down power supply domain. Correspondingly, the RTC module 710 may include a plurality of logic gates corresponding to the power supply domains, where each logic gate is configured to isolate or pass control and access signals of a corresponding power supply domain based on a respective isolation enable signal.

Figure 8:
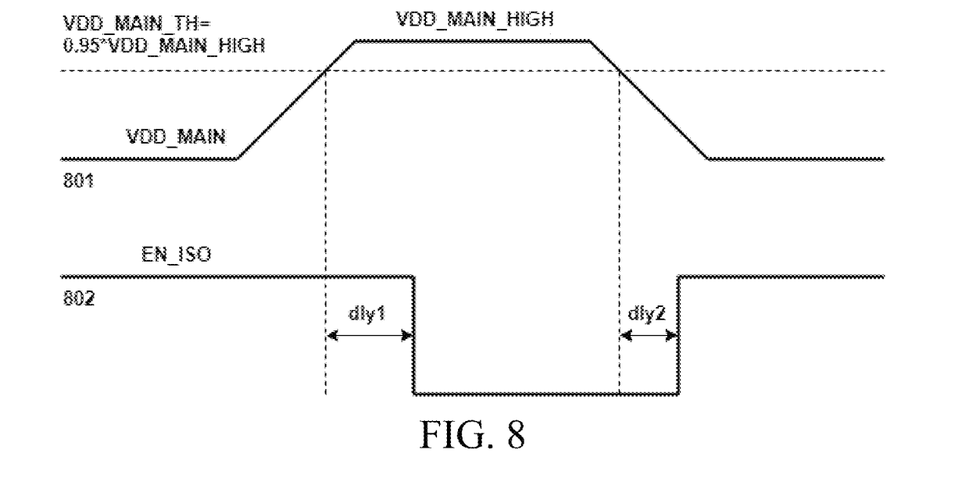
FIG. 8 is a waveform diagram of a voltage detection module in an SoC according to an embodiment of the present disclosure.

FIG. 8 is a waveform diagram of a voltage detection module in an SoC according to an embodiment of the present disclosure. As shown in FIG. 8, in response to the power supply voltage VDD_MAIN of the main control module of the SoC increasing to a value higher than the threshold VDD_MAIN_TH, that is, the main control module recovering from the power-off state to the normal state (in other words, the power-on process), the isolation enable signal EN_ISO correspondingly changes from the effective level to the ineffective level, to indicate that the voltage of the main control module reaches a normal value. In this embodiment, the effective level of the isolation enable signal EN_ISO is a high level, and the ineffective level is a low level. The change of the isolation enable signal in response to the change of the main control module from the power-off state to the normal state may have a time delay dly1, which may be set to a microsecond level, such as lower than 2 μs, and it is advantageous to increase dly1 appropriately, for example, to better ensure the reliability of the isolation. In response to the VDD_MAIN decreasing to a value lower than the threshold VDD_MAIN_TH, that is, the main control module changing from the normal state to the power-off state (in other words, a power-off process), the isolation enable signal EN_ISO correspondingly changes from the ineffective level to the effective level, to indicate that the main control module is powered down. The change of the isolation enable signal in response to the change of the main control module from the normal state to the power-off state may have a delay dly2, which may be set to a microsecond level, such as lower than 2 μs, and it is advantageous to reduce dly2 appropriately, for example, to avoid a situation in which the delayed isolation enable signal EN_ISO has not changed its level in response to the power-off process when the VDD_MAIN drops to a failure voltage, so as to better ensure the reliability of the isolation.

It should be understood that the embodiment in which the effective level is a high level and the ineffective level is a low level shown in FIG. 8 is merely an example, and the effective level of the isolation enable signal EN_ISO may be set to a low level and the ineffective level may be set to a high level.

In the present disclosure, the threshold VDD_MAIN_TH of the power supply voltage of the main control module needs to be set to a value higher than the failure voltage of the main control module, and is associated with the time delay dly2 of level flipping of the isolation enable signal EN_ISO in the power-off process. In an embodiment according to the present disclosure, VDD_MAIN_TH may be set based on the stable power supply voltage VDD_MAIN_HIGH of the main control module after being powered on, for example, as shown in FIG. 8, the threshold VDD_MAIN_TH is set to VDD_MAIN_TH=95%*VDD_MAIN_HIGH.

Figure 9:
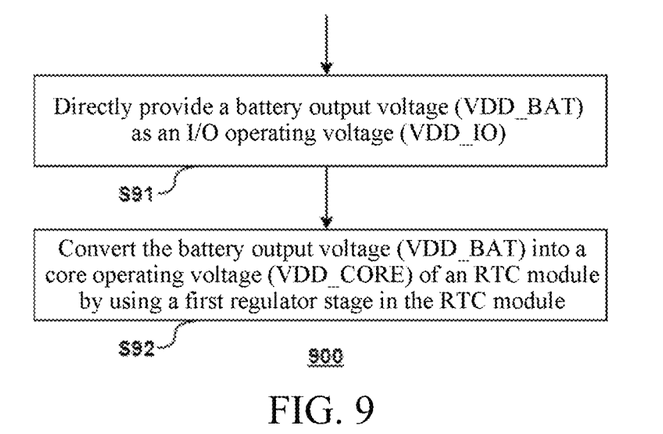
FIG. 9 is a flowchart of a method for an SoC according to an embodiment of the present disclosure.

FIG. 9 is a flowchart of a method for an SoC according to an embodiment of the present disclosure, and the method 900 is applicable to a case in which the VDD_BAT is within a range of VDD_IO. As shown in FIG. 9, at S91, VDD_BAT may be directly provided as VDD_IO; and subsequently, at S92, VDD_BAT may be converted into VDD_CORE by using a first regulator stage in an RTC module.

Figure 10:
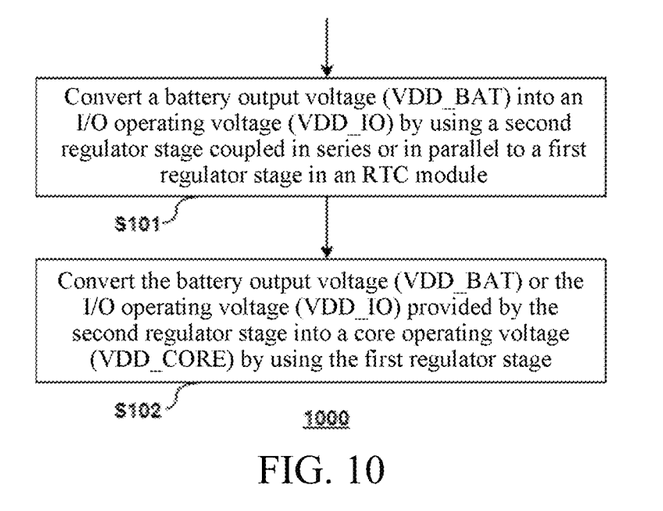
FIG. 10 is a flowchart of a method for an SoC according to an embodiment of the present disclosure.

FIG. 10 is a flowchart of a method for an SoC according to an embodiment of the present disclosure, and the method 1000 is applicable to a case in which the VDD_BAT goes beyond a range of VDD_IO. As shown in FIG. 10, at S101, VDD_BAT may be converted into VDD_IO by using a second regulator stage coupled in series or parallel to a first regulator stage in an RTC module; and subsequently, at S102, VDD_BAT or VDD_IO provided by the second regulator stage may be converted into VDD_CORE by using the first regulator stage.

In all examples that are shown and discussed herein, any specific value should be interpreted only as an example and not as a constraint. Therefore, other examples of the exemplary embodiments may have different values.

For example, as used herein, a term "exemplary" means "used as an example, instance, or illustration", and is not intended to be a "model" to be accurately copied. Any implementation exemplarily described herein is not necessarily to be explained as preferred or advantageous over other implementations. Moreover, the present disclosure is not limited by any expressed or implied principle in the foregoing technical field, background, summary, or description of embodiments.

It should be further understood that the word "include/comprise", when used herein, specifies the presence of stated features, entireties, steps, operations, units, and/or components, but do not preclude the presence or addition of one or more other features, entireties, steps, operations, units, and/or components, and/or combinations thereof.

In addition, in the descriptions of the present disclosure, the terms "first", "second", and "third" are only used for purpose of descriptions, and cannot be understood as indicating or implying relative importance and sequence.

A person skilled in the art should be aware that the boundaries between the foregoing operations are merely illustrative. A plurality of operations can be combined into a single operation, and a single operation can be distributed in an additional operation, and the operations can be performed at least partially overlapping in time. Moreover, alternative embodiments may include a plurality of examples of particular operations, and the operation sequence may be changed in other embodiments. However, other modifications, changes, and replacements are also possible. Therefore, the specification and accompanying drawings are to be regarded as illustrative rather than restrictive.

Despite the detailed illustration of some particular embodiments of the present disclosure by the examples, a person skilled in the art should understand that the foregoing examples are merely intended to describe rather than limit the scope of the present disclosure. Each embodiment disclosed herein may be randomly combined without departing from the spirit and scope of the present disclosure. A person skilled in the art should also understand that various changes can be made to the embodiments without departing from the scope and spirit of the present disclosure. The scope of the present disclosure is defined by the appended claims.

What is claimed is:

1. An apparatus for supplying power to a real time clock (RTC) module of a system on chip (SoC), wherein the RTC module is powered by a battery, and the apparatus is integrated into the RTC module and comprises:
   a first regulator stage, comprising one or more regulators, wherein the first regulator stage is configured to provide a core power supply voltage VDD_CORE based on a battery output voltage VDD_BAT; and
   a crystal oscillator I/O unit, the crystal oscillator I/O unit being powered by the core power supply voltage VDD_CORE and an I/O power supply voltage VDD_IO,
   wherein the apparatus directly provides the battery output voltage VDD_BAT as the I/O power supply voltage VDD_IO.

2. The apparatus according to claim 1, wherein the apparatus further comprises:
   a second regulator stage, comprising one or more regulators, wherein the second regulator stage is configured to provide the I/O power supply voltage VDD_IO based on the battery output voltage VDD_BAT,
   wherein
   the second regulator stage is coupled in series to the first regulator stage, the second regulator stage is configured to convert the battery output voltage VDD_BAT into the I/O power supply voltage VDD_IO, and the first regulator stage is configured to convert the I/O power supply voltage VDD_IO provided by the second regulator stage into the core power supply voltage VDD_CORE; or
   the second regulator stage is coupled in parallel to the first regulator stage, the second regulator stage is configured to convert the battery output voltage VDD_BAT into the I/O power supply voltage VDD_IO, and the first regulator stage is configured to convert the battery output voltage VDD_BAT into the core power supply voltage VDD_CORE.

3. The apparatus according to claim 2, wherein the first regulator stage and the second regulator stage share a reference voltage V_REF generated by a bandgap circuit.

4. The apparatus according to claim 2, wherein a third regulator stage is coupled between the first regulator stage and the second regulator stage, and the first regulator stage, the second regulator stage, and the third regulator stage are configured to coordinate to provide the core power supply voltage VDD_CORE and the I/O power supply voltage VDD_IO based on the battery output voltage VDD_BAT,
   wherein,
   in a case that the second regulator stage is coupled in series to the first regulator stage, the third regulator stage is coupled in series or in parallel to one of the first regulator stage and the second regulator stage and then coupled in series to the other of the first regulator stage and the second regulator stage, alternatively,
   in a case that the second regulator stage is coupled in parallel to the first regulator stage, the third regulator stage is coupled in series or in parallel to one of the first regulator stage and the second regulator stage and then coupled in parallel to the other of the first regulator stage and the second regulator stage.

5. The apparatus according to claim 2, wherein the apparatus further comprises an undervoltage detection module, and the undervoltage detection module is configured to:
   perform undervoltage detection on the battery output voltage; and
   in a case that the battery output voltage VDD_BAT is lower than a battery output voltage threshold, generate an undervoltage indication signal, wherein the undervoltage indication signal is stored in the RTC module and outputted to a main control module of the SoC, to trigger a battery undervoltage alarm of the main control module.

6. The apparatus according to claim 5, wherein the first regulator stage, the second regulator stage, and the undervoltage detection module share a reference voltage V_REF generated by a bandgap circuit.

7. The apparatus according to claim 6, wherein the battery output voltage threshold is set to a multiple of the reference voltage V_REF.

8. A real time clock (RTC) module for implementing a system on chip (SoC), wherein the RTC module comprises:
the apparatus according to claim 1; and
a voltage detection module, configured to detect a power supply voltage of a main control module of the SoC and in a case that a power supply voltage of the main control module is lower than a main control power supply voltage threshold, output an isolation enable signal to isolate, from the RTC module, a signal from the main control module.

9. The RTC module according to claim 8, wherein the first regulator stage, the second regulator stage, and the voltage detection module share a reference voltage V_REF generated by a bandgap circuit.

10. The RTC module according to claim 8, wherein signals from a plurality of power supply domains of the SoC are fed to the RTC module, the RTC module comprises a plurality of voltage detection modules respectively corresponding to the plurality of power supply domains, each of the plurality of voltage detection modules is configured to detect a power supply voltage of a corresponding power supply domain, and in a case that the power supply voltage of the corresponding power supply domain is lower than a threshold, output an isolation enable signal to isolate, from the RTC module, the signal from the corresponding power supply domain.

11. The RTC module according to claim 8, wherein the main control power supply voltage threshold is higher than a failure voltage of the main control module and is associated with a time delay of level flipping of the isolation enable signal in a power-off process.

12. A method for supplying power to a real time clock (RTC) module of a system on chip (SoC), wherein the RTC module is powered by a battery, and the method comprises:
in a case that a range of a battery output voltage VDD_BAT is within a range of an I/O power supply voltage VDD_IO, directly providing the battery output voltage VDD_BAT as the I/O power supply voltage VDD_IO, and converting the battery output voltage VDD_BAT into a core power supply voltage VDD_CORE by using a first regulator stage that is in the RTC module and comprises one or more regulators; and
in a case that the range of the battery output voltage VDD_BAT goes beyond the range of the I/O power supply voltage VDD_IO:
converting the battery output voltage VDD_BAT into the I/O power supply voltage VDD_IO by using a second regulator stage that is in the RTC module and coupled in series to the first regulator stage and comprises one or more regulators, and converting the I/O power supply voltage VDD_IO provided by the second regulator stage into the core power supply voltage VDD_CORE by using the first regulator stage; or
converting the battery output voltage VDD_BAT into the I/O power supply voltage VDD_IO by using a second regulator stage that is in the RTC module and coupled in parallel to the first regulator stage and comprises one or more regulators, and converting the battery output voltage VDD_BAT into the core power supply voltage VDD_CORE by using the first regulator stage,
wherein the core power supply voltage VDD_CORE and the I/O power supply voltage VDD_IO are used for supplying power to the crystal oscillator I/O unit.

13. The method according to claim 12, wherein the first regulator stage and the second regulator stage share a reference voltage V_REF generated by a bandgap circuit.

14. The method according to claim 12, wherein a third regulator stage in the RTC module is coupled between the first regulator stage and the second regulator stage, and the method further comprises providing the core power supply voltage VDD_CORE and the I/O power supply voltage VDD_IO based on the battery output voltage VDD_BAT by using coordination among the first regulator stage, the second regulator stage, and the third regulator stage.

15. The method according to claim 12, wherein the method further comprises using an undervoltage detection module in the RTC module to perform the following steps:
performing undervoltage detection on the battery output voltage; and
in a case that the battery output voltage VDD_BAT is lower than a battery output voltage threshold, generating an undervoltage indication signal, wherein the undervoltage indication signal is stored in the RTC module and outputted to a main control module of the SoC, to trigger a battery undervoltage alarm of the main control module.

16. The method according to claim 15, wherein the first regulator stage, the second regulator stage, and the undervoltage detection module share a reference voltage V_REF generated by a bandgap circuit.

17. The method according to claim 16, wherein the battery output voltage threshold is set to a multiple of the reference voltage V_REF.

18. A method for a real time clock (RTC) module of a system on chip (SoC), wherein the method comprises:
the method according to claim 12; and
detecting a power supply voltage of a main control module of the SoC by using a voltage detection module in the RTC module, and in a case that a power supply voltage of the main control module is lower than a main control power supply voltage threshold, outputting an isolation enable signal to isolate, from the RTC module, a signal from the main control module.

19. The method according to claim 18, wherein the first regulator stage, the second regulator stage, and the voltage detection module share a reference voltage V_REF generated by a bandgap circuit.

20. The method according to claim 18, wherein signals from a plurality of power supply domains of the SoC are fed to the RTC module, the RTC module comprises a plurality of voltage detection modules respectively corresponding to the plurality of power supply domains, and the method further comprises detecting a power supply voltage of a corresponding power supply domain by using each of the plurality of voltage detection modules, and in a case that the power supply voltage of the corresponding power supply domain is lower than a threshold, outputting an isolation enable signal to isolate, from the RTC module, the signal from the corresponding power supply domain.

* * * * *